(12) United States Patent
Wang

(10) Patent No.: US 9,575,201 B2
(45) Date of Patent: Feb. 21, 2017

(54) APPARATUS AND METHOD FOR DOWNHOLE RESISTIVITY MEASUREMENTS

(71) Applicant: Well Resolutions Technology, Houston, TX (US)

(72) Inventor: Tsili Wang, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 175 days.

(21) Appl. No.: 14/251,388

(22) Filed: Apr. 11, 2014

(65) Prior Publication Data

US 2015/0293254 A1    Oct. 15, 2015

(51) Int. Cl.
| | |
|---|---|
| *G01V 3/00* | (2006.01) |
| *G01V 3/26* | (2006.01) |
| *E21B 49/00* | (2006.01) |
| *E21B 47/12* | (2012.01) |
| *G01V 3/28* | (2006.01) |

(52) U.S. Cl.
CPC ............ *G01V 3/26* (2013.01); *E21B 47/122* (2013.01); *E21B 49/00* (2013.01); *G01V 3/28* (2013.01)

(58) Field of Classification Search
CPC .................................. G01V 3/26; E21B 49/00
USPC ........................................ 324/366, 355, 351
See application file for complete search history.

(56) References Cited

U.S. PATENT DOCUMENTS

| | | | |
|---|---|---|---|
| 3,305,771 A | 2/1967 | Arps | |
| 4,445,734 A * | 5/1984 | Cunningham | H01R 13/523 439/194 |
| 5,339,037 A | 8/1994 | Bonner et al. | |
| 5,463,320 A * | 10/1995 | Bonner | G01V 3/20 324/366 |
| 6,359,438 B1 | 3/2002 | Bittar | |
| 6,373,254 B1 | 4/2002 | Dion et al. | |
| 7,095,233 B1 * | 8/2006 | Tabanou | G01V 3/20 324/347 |
| 7,576,543 B2 | 8/2009 | Ritter et al. | |
| 7,746,078 B2 * | 6/2010 | Bittar | G01V 3/24 324/357 |
| 7,928,733 B2 * | 4/2011 | Gorek | G01V 3/24 324/357 |
| 8,129,994 B2 | 3/2012 | Wang | |
| 8,319,498 B2 | 11/2012 | Wang | |
| 2004/0119476 A1 * | 6/2004 | Homan | G01V 3/28 324/342 |
| 2005/0083161 A1 * | 4/2005 | Minerbo | G01V 3/28 336/132 |

(Continued)

*Primary Examiner* — Tung X Nguyen
*Assistant Examiner* — Dominic Hawkins
(74) *Attorney, Agent, or Firm* — Andrews Kurth Kenyon LLP

(57) ABSTRACT

A downhole tool includes a body having a longitudinal axis and bore therethrough, an array of longitudinal electrode segments separated by electrical insulators, wherein substantially an entire cross section of said body comprises at least one electrode segment, at least one longitudinal electrode configured to emit a first electrical current into said formation and measure said first emitted current, at least one longitudinal electrode segment configured to emit a second electrical current for directing said first emitted current into said formation, and at least one longitudinal electrode segment configured to receive said first emitted current returning from said formation.

15 Claims, 10 Drawing Sheets

(56) References Cited

U.S. PATENT DOCUMENTS

| | | | |
|---|---|---|---|
| 2005/0116718 A1* | 6/2005 | Chen | G01V 3/28 |
| | | | 324/338 |
| 2007/0048108 A1* | 3/2007 | Reynolds | F16B 33/004 |
| | | | 411/366.1 |
| 2010/0182040 A1* | 7/2010 | Feng | H01L 21/76898 |
| | | | 326/38 |
| 2011/0058116 A1* | 3/2011 | Yamazaki | H01L 27/1225 |
| | | | 349/43 |
| 2013/0239673 A1* | 9/2013 | Garcia-Osuna | E21B 17/16 |
| | | | 73/152.46 |

* cited by examiner

APPARATUS AND METHOD FOR DOWNHOLE RESISTIVITY MEASUREMENTS

FIELD OF THE INVENTION

Embodiments disclosed herein relate to, for example, an apparatus and the method of use for downhole resistivity measurement while drilling. The apparatus is particularly about employing electrical gaps built in a drill collar for injecting currents into the medium surrounding the drill collar. One particular use of such an apparatus is for measurement of high-resistivity formations. Because the drill collar helps focus the electrical current to flow in a lateral direction, such a measurement is preferably referred to as lateral resistivity measurement.

BACKGROUND AND SUMMARY OF THE INVENTION

Lateral resistivity measurement has been used for decades to measure high resistivity formations, e.g., tight sands and carbonates with no or few fractures or "vugs," in the presence of low-resistivity drilling fluids. The ratio of formation resistivity to drilling fluids resistivity often exceeds 10000. Induction logging tools generally are unable to provide satisfactory measurement of such formations because the measurement may be highly biased by conductive mud. Electrode-based lateral resistivity measurement is also affected by conductive mud as electrical current tends to bypass the formation through the mud column. However, lateral resistivity tools minimize the electrical current bypass effect by forcing currents to enter the formation in a lateral direction.

Classical lateral resistivity tools employ a central measuring electrode to measure current leaving the electrode and a number of guard electrodes placed above and below the central measuring electrode. The guard electrodes help focus the current emitted from the measure electrode into the formation. Focusing current laterally into the formation is accomplished by minimizing the upward and downward current flows along the mud column around the central measure electrode. To do so, longitudinal potential drops above and below the central measuring electrode are monitored and the guard electrode currents are adjusted such that the potential drops at the monitoring electrodes are minimized. The depth of investigation is controlled by the total length of the guard electrodes or more precisely, the current focusing span. The longer the current focusing span, the deeper the depth of investigation generally is.

In logging while drilling, lateral resistivity measurements may be made by injecting electrical current to a drill collar. Because of the high conductivity of collar materials, current tends to leave the collar in radial directions, thus forming the current focusing effect. Meanwhile, at least one return electrode must be provided to collect the current returning from the formation. The location of the return electrode affects the depth of investigation of the measurement, whereas the length of the electrode affects the sensitivity of the measured resistivity to the formation in front of the electrode. Such sensitivity should be minimized so that the measured resistivity reflects only the resistivity of the formation directly in front of the measure electrode. To do so, a sufficiently long return electrode should be employed.

The prior art for lateral resistivity measurements while drilling employ either toroidal (e.g., doughnut-shaped) coils or electrodes. They have several shortcomings. Those tools employing toroidal coils require reducing the outer diameter of a drill collar at certain locations in order to build such coils, which may result in weakened locations on the drill collar. Second, the complexity of toroidal coils often substantially increase the construction and maintenance costs of the tools. A toroidal coil may include four major components: core material, antenna windings, cover or shield, and nonconducting filling materials. The shield, in particular, needs special care for designing and being locked to the collar. Moreover, toroidal coils must operate at a sufficiently high frequency, usually on the order of a few kHz, to induce a useful amount of current in the collar. The higher frequency raises the effective resistance of the drill collar and thus result in higher ohmic loss in the collar. The higher frequency can also reduce the depth of investigation of the measurement, especially in low-resistivity formations.

The primary shortcoming of the electrode-based apparatus is limitations on the size of an electrode that can be built on a drill collar. To mount an electrode to a drill collar, the electrode must be electrically insulated from the collar. This may be relatively easy for a small electrode (e.g., a few inches or less than a foot in length) such as those used for microresistivity measurement but will quickly become difficult or even impractical to do for a large electrode several feet long or longer. A long electrode is less durable in harsh downhole environments because the large areas of insulating materials inserted between the electrode and the drill collar may generally reduce the integrity of the drill collar and electrode. That is, integrity of the drill collar and electrode may decrease as electrode size increases. Second, electrodes mounted on the outer diameter of a drill collar can create pessimistic current paths that deteriorates or destroys the current focusing effect. This is illustrated in FIG. 1. In the figure, two guard electrodes 2 surround the measuring electrode 1 from above and below, respectively. All the electrodes are mounted about the outer diameter of the drill collar 10 and are electrically insulated 3 from the drill collar from the sides and underneath. It is often desirable to space the electrodes apart with collar materials in between for mounting purposes. In operation, current is usually injected to the guard and measure electrodes and returned to the return electrodes. Part of the injected current will enter, as desired, the formation in front of the guard and measure electrodes. Part of the injected current 5, however, will unfortunately leak directly to the return electrodes through the collar body between the electrodes. The current leakage deteriorates current focusing and lowers the ability of the tool to measure the formation resistivity in the presence of highly conductive mud. Accordingly, a downhole resistivity measurement tool overcoming shortcomings of the prior art is needed.

In one aspect, embodiments disclosed herein relate to a downhole tool used for measuring high-resistivity formations in the presence of drilling fluids including a body having a longitudinal axis and bore therethrough, an array of longitudinal electrode segments separated by electrical insulators, wherein substantially an entire cross section of said body comprises at least one electrode segment, at least one longitudinal electrode configured to emit a first electrical current into said formation and measure said first emitted current, at least one longitudinal electrode segment configured to emit a second electrical current for directing said first emitted current into said formation, and at least one longitudinal electrode segment configured to receive said first emitted current returning from said formation, wherein said electrical insulators facilitate measurement of said high-resistivity formations only after substantially all of said first emitted current being conducted between longitudinal electrode segments first passes substantially through said formation or drilling fluids or both.

In other aspects, embodiments disclosed herein relate to a method of measuring high-resistivity formations in the presence of drilling fluids, the method including providing a tool having an array of longitudinal electrode segments separated by electrical insulators, wherein substantially an entire cross section of said tool comprises at least one electrode segment, emitting and measuring a first electrical current from at least one of said longitudinal electrode segments, emitting a second electrical current from one of said longitudinal electrode segments for directing said first electrical current into said formation, and receiving said first emitted electrical current at one or more of said longitudinal electrode segments returning from said formation, wherein said electrical insulators facilitate measurement of said high-resistivity formations only after substantially all of said first electrical current being conducted between longitudinal electrode segments first passes through said formation or drilling fluids or both.

DETAILED DESCRIPTION

Figure 1:
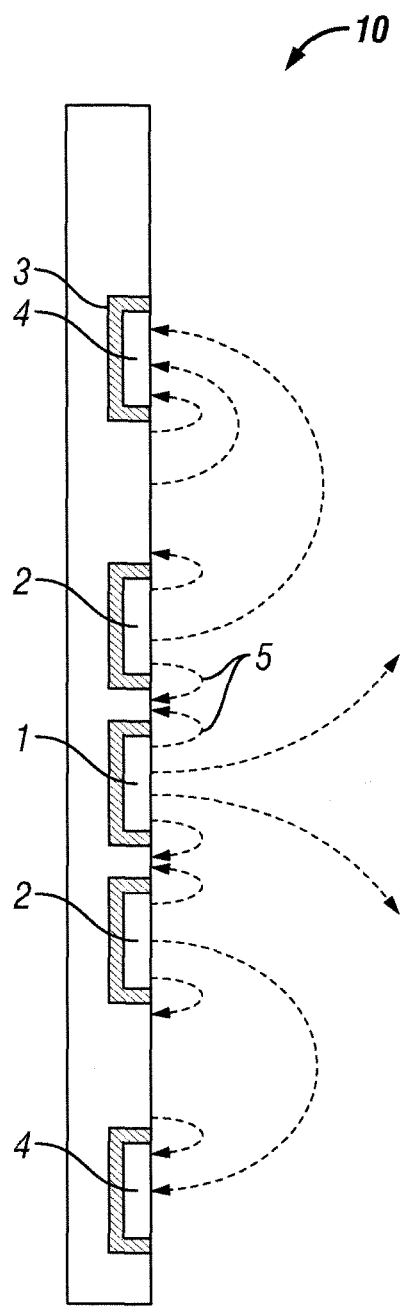
FIG. 1 illustrates a prior art lateral resistivity measurement tool.

A downhole resistivity measurement tool and methods of use are disclosed. Particularly, the downhole resistivity measurement tool is useful for measuring high-resistivity formations (e.g., above 100 ohms) in the presence of low-resistivity mud (e.g., below 1 ohm). The downhole resistivity measurement tool may also be useful for measuring low-resistivity formations (e.g., below 1 ohm). The tool may have any size and shape so long as it is suitable for use in downhole environments. The body of the downhole resistivity measurement tool usually has a longitudinal axis and an array of longitudinal electrode segments separated by electrical insulators. In one embodiment, the electrical insulators are adjacent each of the longitudinal electrodes. The longitudinal electrode segments are typically larger electrode segments than the prior art and may be fully insulated from the body despite their size. That is, the longitudinal electrode segments may have greater length and width than prior art electrodes. In one embodiment, the longitudinal electrode segments are substantially the entire width of the tool. That is, substantially an entire cross section of said body comprises at least one, or some, or all, electrode segments. That is, an electrode segment width to tool width ratio may be about 1:1. In other embodiments, an electrode segment width to tool width ratio may be less than about 1:1, down to a ratio of about 0.25:1. The longitudinal electrode segments may have different or the same longitudinal lengths. For example, electrode segments may range from one or two inches in length up to one foot, two feet, five feet, or more in length.

One or more of the longitudinal electrode segments may be configured to emit electrical current, one or more of the electrode segments may be configured to direct electrical current into a desired portion of said formation, and one or more of said longitudinal segments may be configured to receive emitted electrical current returning from said formation. Longitudinal electrode segments may be configured as measuring electrodes, guard electrodes, and/or current return electrodes. Measuring electrodes may be configured to emit electrical current and measure the emitted current. Guard electrodes may be configured to direct the current emitted from the measuring electrode into a desired portion of said formation. Current return electrodes may be configured to receive emitted current returning from the formation.

Electrical insulators, or "gaps," are configured to separate the longitudinal electrode segments. That is, electrical insulators disposed between the electrode segments are configured to facilitate measurement of said high-resistivity formations only after substantially all emitted current being conducted between longitudinal electrode segments first passes substantially through a desired portion of said formation or drilling fluids or both. In embodiments, an electrode segment length to electrical insulator length (in the longitudinal direction) may be at least 2:1, or at least 3:1, or at least 5:1, or at least 10:1, or at least 20:1. Electrical insulators may be configured to span through substantially an entire cross-sectional area of said body. That is, an electrical insulator cross-sectional area to tool cross-sectional area ratio may be 1:1. In other embodiments, an electrical insulator cross-sectional area to tool cross-sectional area ratio may be less than 1:1. The electrical insulators are configured to substantially prohibit electrical current from being conducted between longitudinal electrode segments without substantially all of the electrical current first passing through the formation or mud. The electrical insulators may comprise any type of insulator or insulating material or otherwise suitable for downhole environments.

Figure 2:
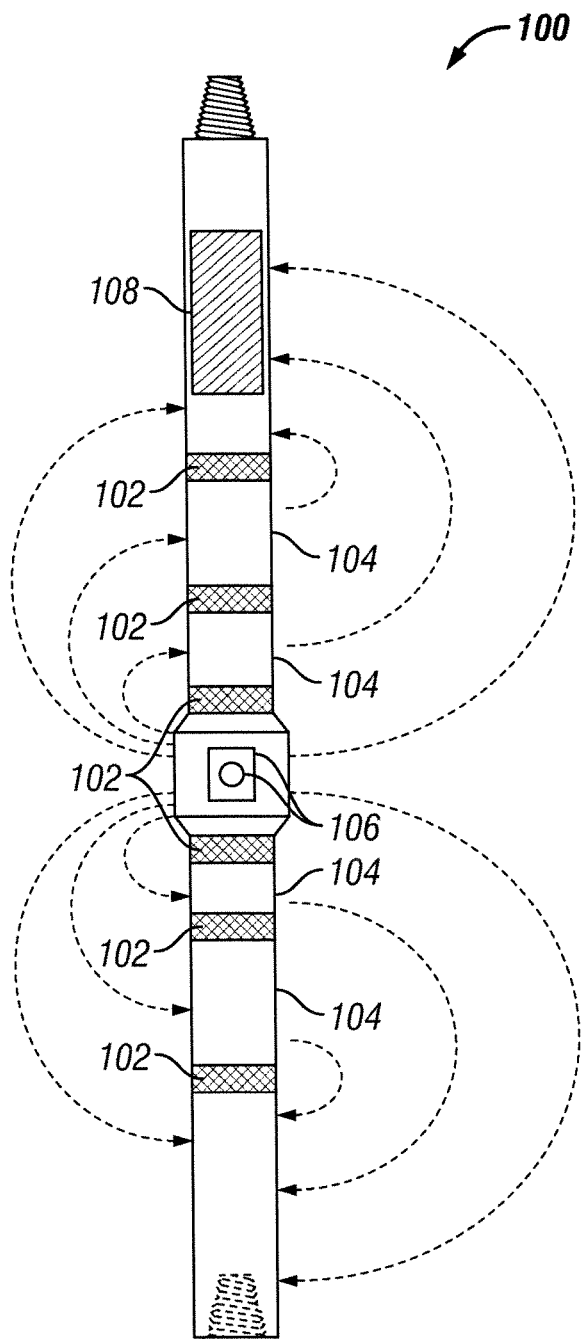
FIG. 2 illustrates a side view of a lateral resistivity measurement tool in accordance with an embodiment.

FIG. 2 depicts an electrical resistivity logging tool 100 according to an embodiment. An array of electrical insulators 102 are inserted in a drill collar, creating electrically isolated longitudinal segments 104 (electrodes). Electrodes covering part of the collar circumference may also be used for making azimuthal measurements while the collar rotates. Those electrodes are referred to as azimuthal electrodes 106, in contrast to the longitudinal electrodes. For illustrative purposes only, six electrical insulators and seven electrically isolated segments are shown, however any number of electrical insulators and electrically isolated segments may be included. In a deep measurement mode, the longitudinal electrodes 104 numbered 2, 3, 5, and 6 are used as guard electrodes and the longitudinal electrode numbered 4 is used as a measuring electrode. The longitudinal electrodes 104 numbered 1 and 7 are used to receive current returning from a formation. The long current focusing area result in a larger depth of investigation. In a shallow measurement mode, the electrode numbered 4 is used as guard electrode. All the other longitudinal electrodes (numbered 1, 2, 3, 5, 6, and 7) are used for current return. The azimuthal electrode(s) 106 residing on the longitudinal electrode 4 are used for current sensing. The depth of investigation of this measurement mode is shallow because of the proximity of the current sensing electrodes to the return electrodes. All the measure currents are converted to apparent formation resistivities using the following equation:

$$R_a = K \frac{V}{I_0}$$

where K is the geometrical factor, V the electrical potential of the measure electrode, and $I_0$ the measure current departing from the measure electrode. The apparent resistivity provides qualitative indication of the formation resistivity in front of the measure electrode. Low formation resistivity generally yields a lower apparent resistivity and vice versa.

Figure 3:
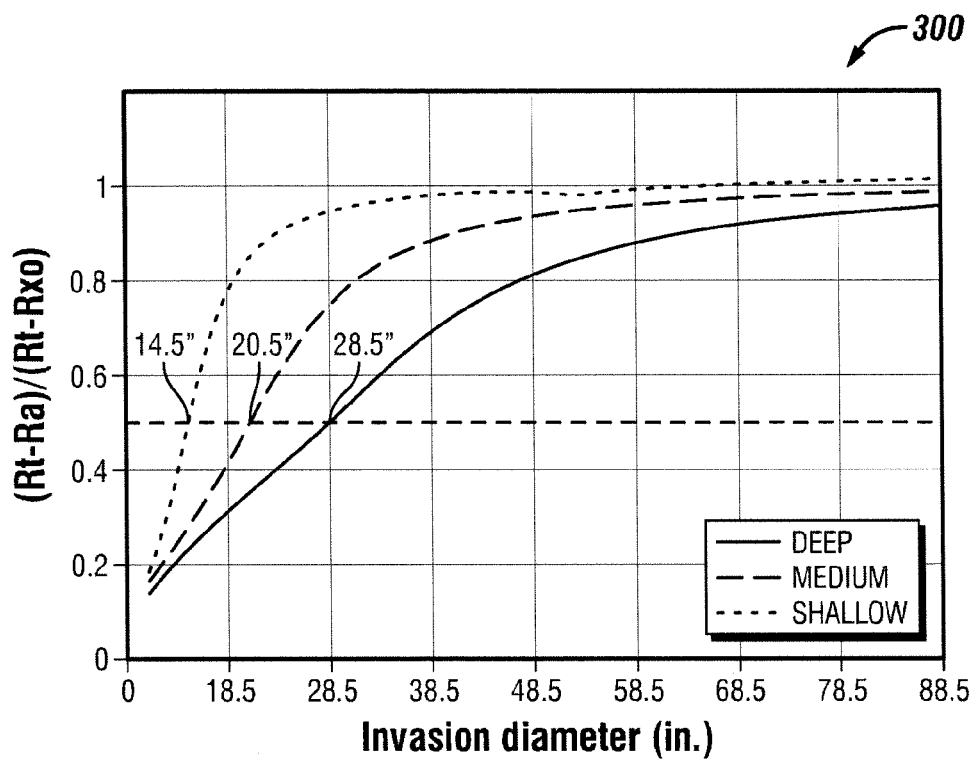
FIG. 3 illustrates a graph of investigation depths for different measurement modes using lateral resistivity measurement tools in accordance with an embodiment.

The depth of investigation of the lateral resistivity measurement is quantified by the pseudo-geometrical factor:

$$G = \frac{R_t - R_a}{R_t - R_{xo}}$$

where $R_t$ is the unperturbed formation resistivity, $R_a$ the apparent resistivity, and $R_{xo}$ the flushed zone resistivity. The pseudo-geometrical factor reflects the ability of the tool to measure the virgin formation resistivity through a flushed zone. The depth of investigation is taken to be half the flushed zone diameter corresponding to G=0.5. FIG. 3 illustrates a graph 300 showing the depths of investigation of three different measurement modes: shallow, medium, and deep. The mud, flushed zone, and formation resistivities are 0.02 ohm, 10 ohm, and 100 ohm, respectively. The collar size is 7 in. and the borehole diameter is 8.5 in.

Figure 4:
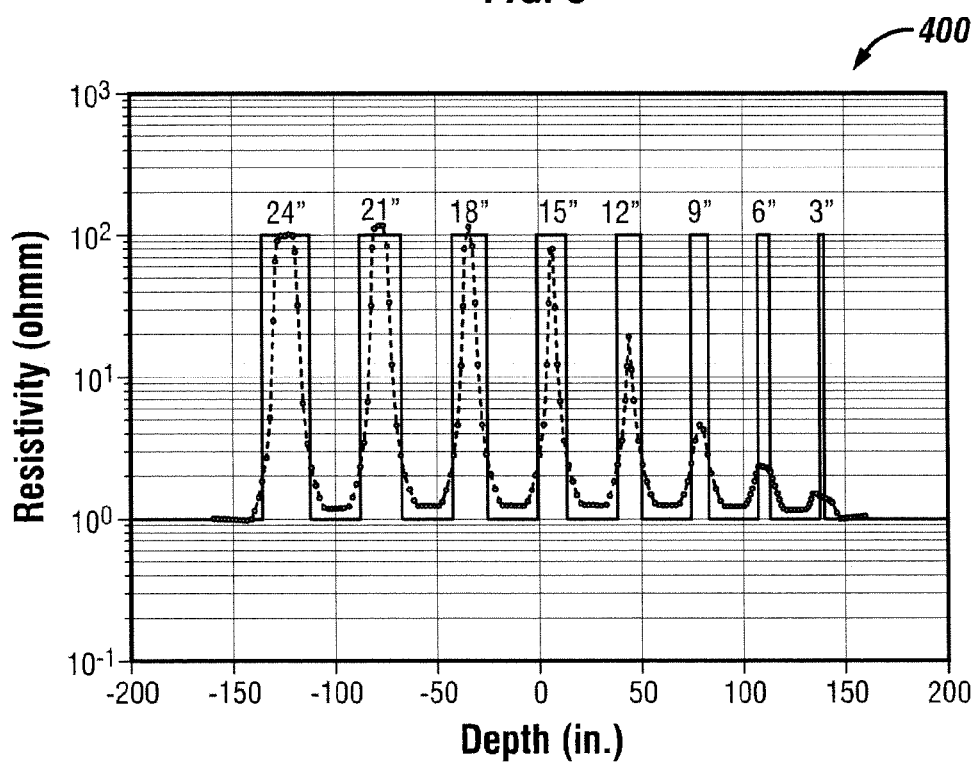
FIG. 4 illustrates a graph of deep measurement response through a sequence of formation beds with alternating resistivity values of 1 ohm and 100 ohm in accordance with an embodiment.

FIG. 4 illustrates a graph 400 showing the deep measurement response through a sequence of formation beds with alternating resistivity values of 1 ohm and 100 ohm. The bed thickness ranges from 3 in. to 24 in. The bed resistivity can be accurately measured if the bed is thicker than 15 in. Thinner beds may not be correctly measured.

While current is measured from the central longitudinal electrode 4, azimuthal electrodes monitor the currents entering the formation from different sectors of the collar. The azimuthal electrodes are kept at the same potential as the guard and measure electrodes. The currents, after scaled by the respective geometrical factors, yield a plurality of apparent resistivities corresponding to the different azimuthal sectors. As the collar rotates, one azimuthal electrode may suffice for an azimuthal measurement. Current from the measure electrode is continuously monitored as the tool rotates. The azimuthal location or tool face angle may be measured with any directional sensors such as accelerometers, magnetometers, or gyros. By associating the measured current or apparent resistivity with a tool face angle, it is possible to form a plurality of azimuthal measurements within a given time window.

Figure 5:
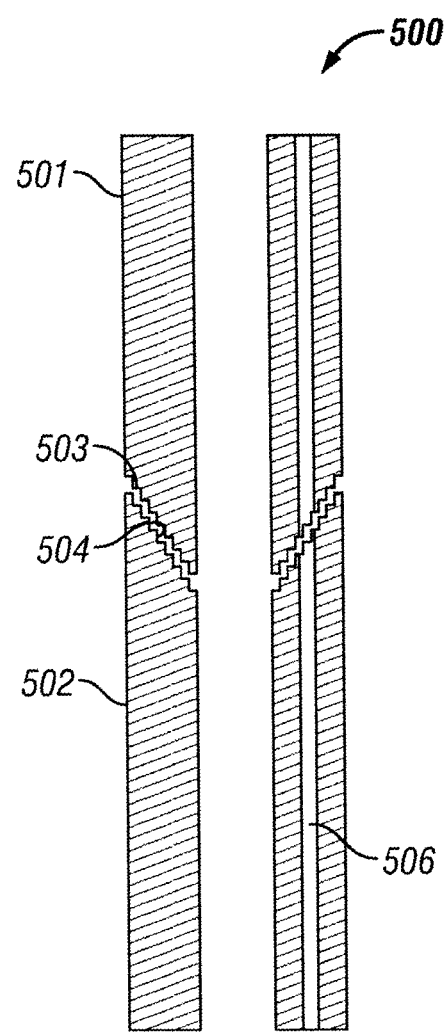
FIG. 5 illustrates a cross-section view of an electrical insulator in accordance with an embodiment.

An example of constructing a longitudinal electrical gap 500 is shown in FIG. 5. Two pieces of drill collar 501, 502 are machined to be joined together by threads. A first drill collar portion 501 has a pin thread 503, a second drill collar portion 502 has a box thread 504. The threads are electrically insulated with insulating materials such as ceramic, fiberglass, or epoxy. The width of the gap may range from 0.1" to 1." A wire way 506 is drilled within the collar wall to allow wires to run across the gap. Alternatively, wires may be run through a probe (not shown) located near the longitudinal axis of the collar. An electrical voltage is driven across the gap to produce a current flow between the two collar pieces. The electrical gap may also be shorted to allow the two collar piece to behave as a single electrode.

Figure 6:
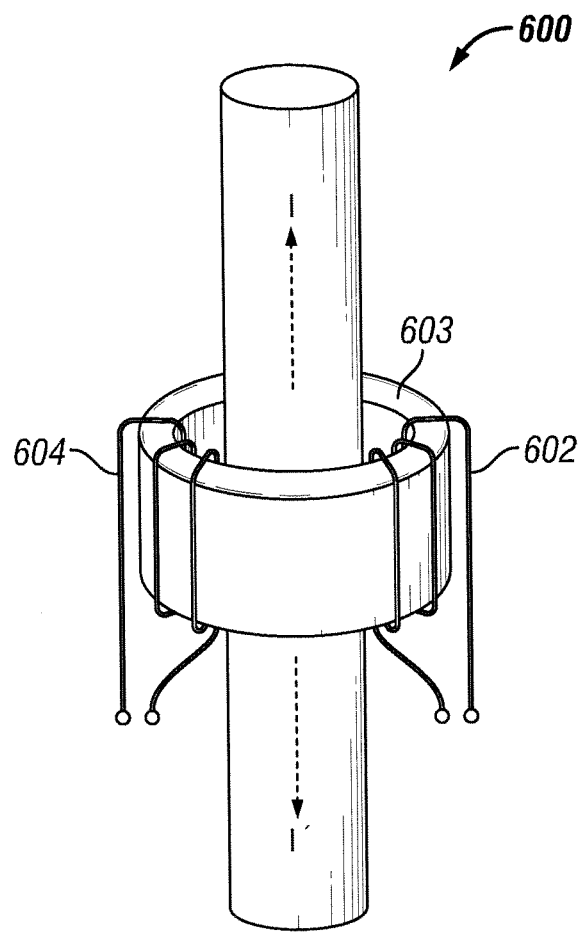
FIG. 6 illustrates a perspective view of a longitudinal electrical gap in accordance with an embodiment.

In another example shown in FIG. 6, an electrical gap 600 may be constructed with one or more toroidal coils wound around a drill collar. To demonstrate, assume a current I flowing within the collar wall generated by an adjacent current source embedded in the same collar. To produce an electrical gap, the first toroidal coil 602 generates a counter current I' that flows in the opposite direction to I. The net current within the collar wall then becomes Ic=I−I'. The net current is monitored with a second toroidal coil 604. The two toroidal coils may share the same core 603, though this is not necessary. A transmitting circuit is attached to the first toroidal coil 602 and a receiving circuit is attached to the second toroidal coil 604. An ideal electrical gap, called the virtual gap, is generated by adjusting the counter current so that the net collar current is zero. A partial electrical gap results if the two currents do not have the same amplitude.

Figure 7:
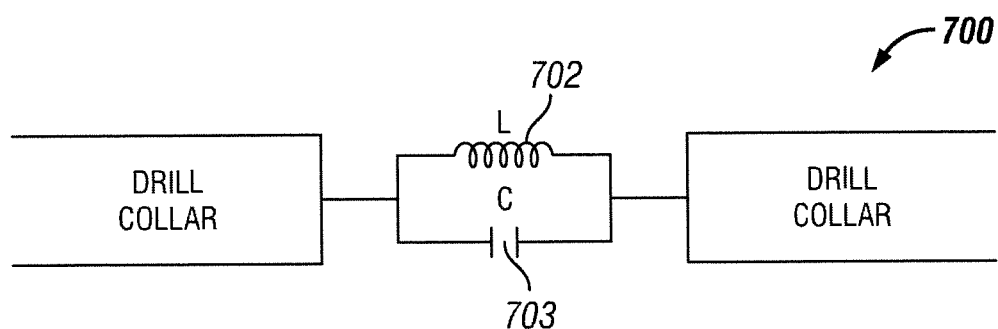
FIG. 7 illustrates an exemplary schematic of a selective switch circuit in accordance with an embodiment.

It will be desirable to make resistivity measurements at multiple depths of investigation simultaneously. This will require producing a long-span current focusing area and a short-span current focusing area at the same time. Again refer to FIG. 2. As aforementioned, for deep measurement the longitudinal electrodes 2, 3, 5, and 6 are used as guard electrodes, whereas the electrodes 1 and 7 are used as return electrodes. For shallow focusing, on the other hand, the electrodes 1, 2, 3, 5, 6, and 7 are all used as return electrodes. To open and short an electrical gap at the same time for different modes of measurement, a selective switch circuit is used, assuming that different frequencies are used for different modes of measurement. An example of such a selective switch circuit 700 is shown in FIG. 7 with an inductor 702 connected in parallel to a capacitor 703. The circuit generates a maximum impedance at its resonance frequency given by:

$$f_0 = \frac{1}{2\pi\sqrt{LC}}$$

For instance, for L=2 mH and C=20 nF, the maximal impedance will appear around 25 kHz. Now by inserting the circuit in the gap and making the deep measurement at 25 kHz and the shallow measurement at a higher frequency, say, 50 kHz, the gap will appear open for the deep measurement and largely shorted for the shallow measurement. In certain embodiments, it is possible to employ multiple selective switch circuits across multiple gaps to perform simultaneous measurements at additional frequencies. In other embodiments, it is possible to combine physical electrical gaps with virtual electrical gaps to produce various arrangements of electrodes.

Figure 8:
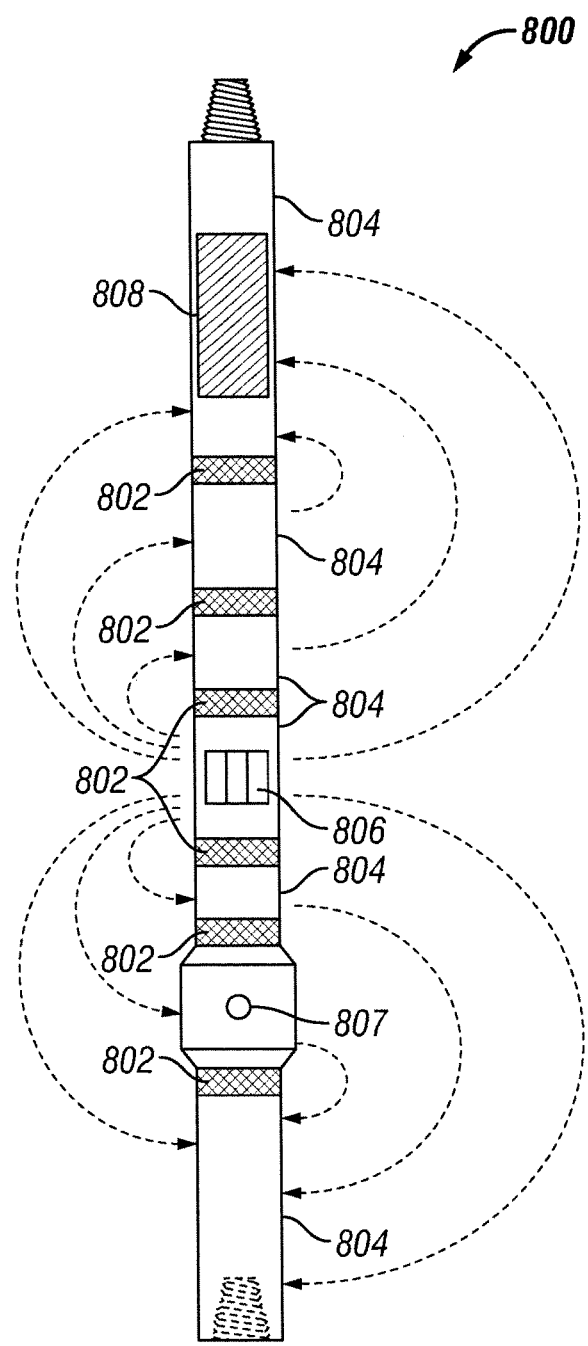
FIG. 8 illustrates a side view of a lateral resistivity measurement tool capable of high-resolution borehole imaging in accordance with an embodiment.

Note that azimuthal electrodes need not to be placed at the same longitudinal location along the drill collar. For instance, the tool 800 shown in FIG. 8, azimuthal electrodes 806 for lateral resistivity measurement may be placed near the center of the guard electrode array. Azimuthal electrodes 807 for high-resolution borehole imaging may be placed near the bottom of the array.

Figure 9:
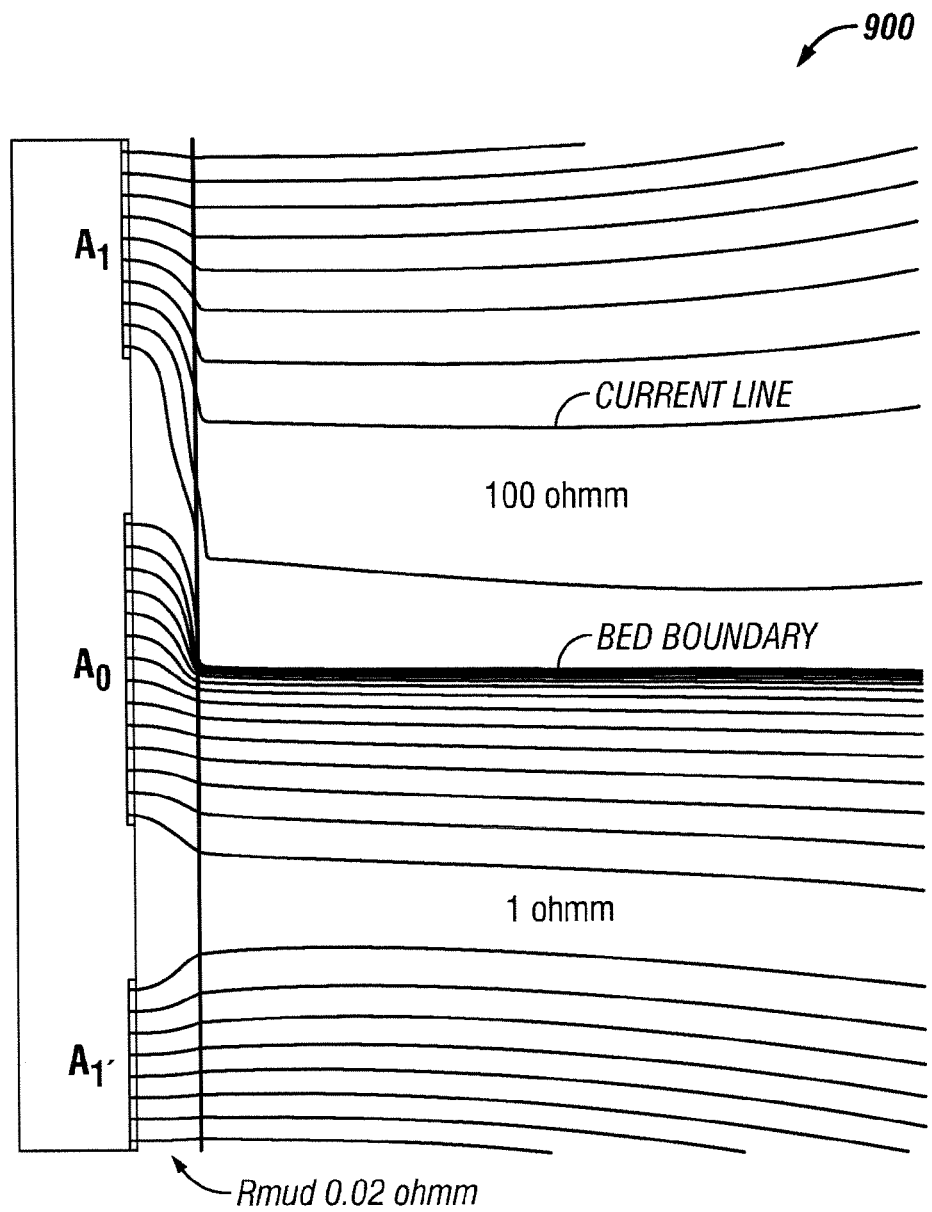
FIG. 9 illustrates a graph of currents emitted from guard electrodes to low-resistivity beds via the mud column.

Limitations exist in using guard electrodes to force current to enter the formation in lateral (radial) directions. In the presence of strong resistivity contrast between adjacent beds, currents emitted from guard electrodes tend to escape to low-resistivity beds via the mud column. This is especially true if the mud is conductive. FIG. 9 illustrates the phenomenon 900. In the figure, three electrodes, $A_0, A_1$, and $A_1'$, emit current at the same potential. The formation is a 100 ohmm bed above a 1 ohmm bed. Because of the high resistivity contrast between the two beds, current tends to enter the 1-ohmm bed through the mud column. Despite all the electrodes are kept at the same potential, current focusing is truly achieved in the vicinity of the bed boundary because the current lines originated from the measure electrode ($A_0$) are deviated from the radial direction.

Figure 10:
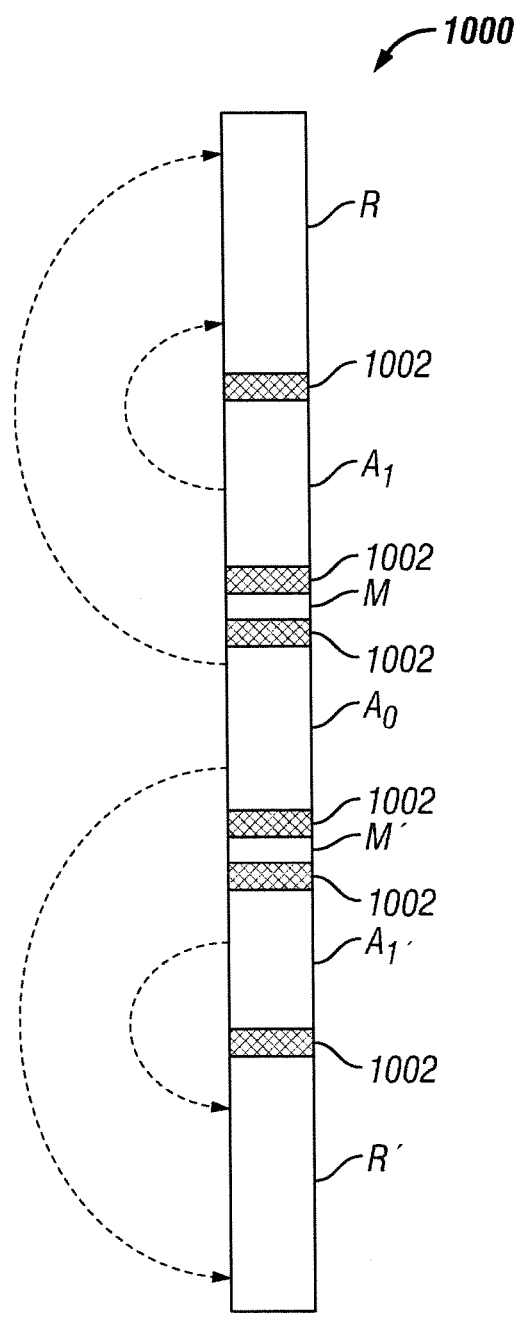
FIG. 10 illustrates a side view of a lateral resistivity measurement in accordance with an embodiment.

Current focusing is best achieved if the longitudinal component of the mud current is eliminated or minimized. To do so, a means is provided to monitor the longitudinal mud current. The information is then fed to an electronic circuit connected to the guard electrodes ($A_1$ and $A_1'$) to adjust the amount of current emitted from the electrodes so that the longitudinal mud current is minimized around the measure electrode. In conventional lateral resistivity devices, the longitudinal mud current is monitored by measuring the potential drop in the direction of the tool axis. This can also be done for LWD lateral resistivity measurement employing electrical gaps 1002, as shown in FIG. 10. In the figure, $A_0$ is a measure electrode, $A_1$ and $A_1'$ are guard electrodes, and R and R' are return electrodes. M and M' are potential monitoring electrodes. To operate, current emitted from $A_1'$ is adjusted, while currents to $A_0$ and $A_1$ are fixed, so that the potentials at M and M' are equal, hence eliminating longitudinal current flow from M to M' through the mud column. The monitoring electrodes are bound to longitudinal electrical gaps. Notice that the equipotential condition is a necessary but not sufficient condition. In other words, equipotentiality between the monitoring electrodes M and M' does not guarantee the absence of longitudinal mud current between the two electrodes, as long as the longitudinal mud current is mirror symmetrical regarding the center point of the measure electrode $A_0$.

Figure 11:
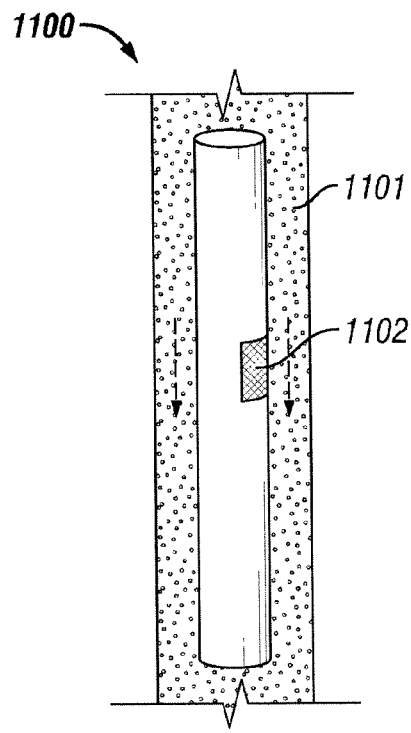
FIG. 11 illustrates a side view of a longitudinal mud current sensor in accordance with an embodiment.
Figure 12:
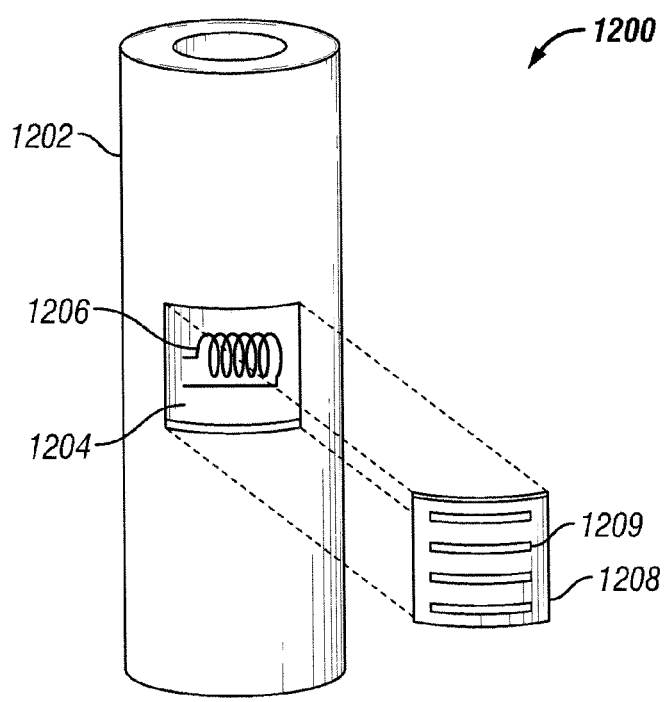
FIG. 12 illustrates a side view with details of the longitudinal mud current sensor in FIG. 11.

Another means to monitor longitudinal mud current is shown in FIG. 11. A current sensor 1102 is mounted off-centered near the outer diameter of the tool body 1100 (drill collar). The current sensor is mostly sensitive to the longitudinal component of the current flowing in the mud column 1101. A longitudinal mud current will produce a magnetic flux pointing in the azimuthal direction near the current sensor. The azimuthal magnetic flux can be monitored with a magnetometer or a coil antenna oriented with a component in the azimuthal direction. An example of such a current sensor 1200 is shown in FIG. 12. In the figure, a coil groove 1204 is first machined on the outer diameter of a drill collar 1202. The groove may be conveniently shaped as a square or rectangle with a depth extent around 1 inch. A coil 1206 is placed in the groove and oriented in the circumferential direction of the collar. The coil may be protected from drilling conditions with an antenna shield 1208 shown on the right side of the figure. The shield generally is made of a metallic material such as stainless steel. To allow magnetic flux to penetrate the shield 1208, slots 1209 may be machined in the shield. The shield is locked to the drill collar through welding, bolts, or other means. For maximum penetration of magnetic flux into the coil groove, the slots are oriented substantially in the circumferential direction. The slots and the cavity in the underneath coil groove may be filled with non-conducting materials such fiberglass, PEEK, or epoxy.

Figure 13:
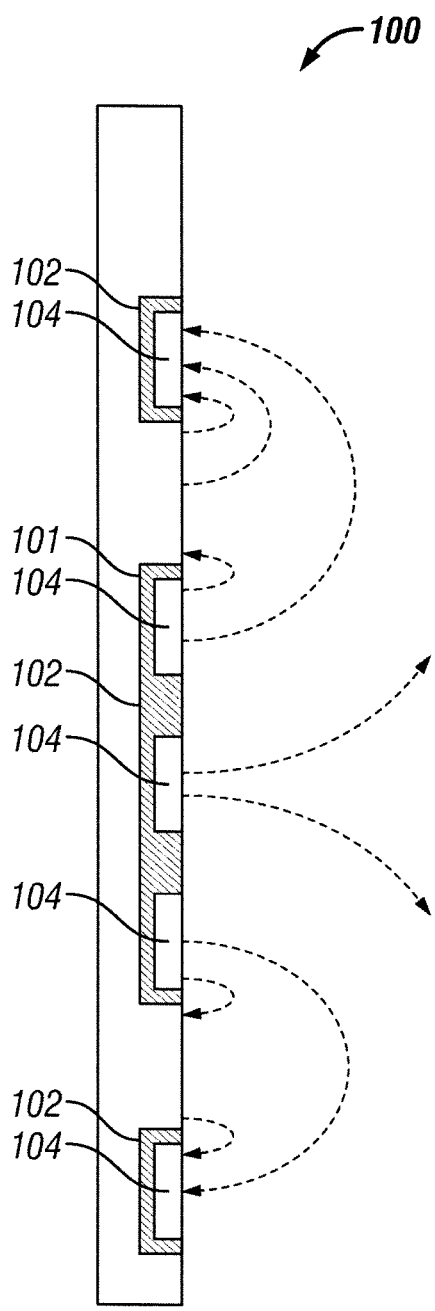
FIG. 13 illustrates a side view of a lateral resistivity measurement tool in accordance with an alternative embodiment.

Though the apparatus discussed above treats the entire cross section of a tool body or collar as the electrode body on which longitudinal electrodes are built, this is not necessary. As illustrated in FIG. 13, in alternative embodiments, a tool 100 may include an electrode body 101 that is attached within a recess of the tool 100. The electrode body 101 may be removable from the tool 100 as a unit. A plurality of electrodes 104 may be mounted in the electrode body 101 each being exposed to drilling mud. The electrodes 104 may be electrically insulated from the tool body and separated by electrical insulators 102 spanning the entire cross section of the electrode body. Electrical insulators 102 may be entirely non-conducting materials such as epoxy, PEEK, fiberglass, and ceramic, or may be partly of non-conducting materials and partly of conducting materials, such as metals. The conducting materials may help protect the electrode body from abrasion or other drilling operations, but may not be exposed to drilling mud and electrically connected to the collar at the same time.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety to the extent that they are not inconsistent and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A downhole tool used for measuring high-resistivity formations in the presence of drilling fluids, the tool comprising:
   a body having a longitudinal axis and bore therethrough;
   an array of longitudinal electrode segments electrically separated by electrical insulators, wherein an entire cross section of said body comprises at least one electrode segment;
   at least one longitudinal electrode segment configured to emit a first electrical current into said formation and measure said first emitted current;
   at least one longitudinal electrode segment configured to emit a second electrical current for directing said first emitted current into said formation, and
   at least one longitudinal electrode segment configured to receive said first emitted current returning from said formation,
   wherein said electrical insulators facilitate measurement of said high-resistivity formations only after substantially all of said first emitted current being conducted between longitudinal electrode segments first passes substantially through said formation or drilling fluids or both.

2. The tool of claim 1, further comprising one or more azimuthal electrodes disposed on said body configured for making measurements as the tool rotates.

3. The tool of claim 1, said electrical insulators comprising:
a pin thread on a first body portion configured to correspond with a box thread on a second body portion; and
an insulating material applied on at least one of said pin and box threads.

4. The tool of claim 3, wherein said insulating material is selected from a group consisting of ceramic, fiberglass, and epoxy.

5. The tool of claim 1, wherein said electrical insulators have a longitudinal width of at least about 0.1 inches up to about 1 inch.

6. The tool of claim 1, wherein said electrical insulators are configurable to be shorted to allow adjacent longitudinal electrode segments to behave as a single electrode segment.

7. The tool of claim 6, further comprising a switch circuit configurable to open and short said electrical insulators for different modes of measurement.

8. The tool of claim 1, wherein said electrical insulators comprise:
a transmitting circuit generating a first current; and
a receiving circuit generating a second current,
wherein an electrical gap is generated by adjusting said second current so that a net current between said first and second currents is substantially zero.

9. The tool of claim 1, further comprising one or more electrodes for monitoring longitudinal mud current.

10. The tool of claim 1, further comprising a sensor for monitoring longitudinal mud current mounted off-center near an outer diameter of said body, wherein said longitudinal mud current produces a magnetic flux near said sensor.

11. The tool of claim 10, said sensor comprising a coil oriented in a circumferential direction of said body within a groove on an outer diameter of said body, and a shield with substantially circumferential slots therein to allow magnetic flux to penetrate said shield.

12. A method of measuring high-resistivity formations in the presence of drilling fluids, the method comprising:
providing a tool having an array of longitudinal electrode segments electrically separated by electrical insulators, wherein an entire cross section of said tool comprises at least one electrode segment;
emitting and measuring a first electrical current from at least one of said longitudinal electrode segments;
emitting a second electrical current from one of said longitudinal electrode segments for directing said first electrical current into said formation; and
receiving said first emitted electrical current at one or more of said longitudinal electrode segments returning from said formation,
wherein said electrical insulators facilitate measurement of said high-resistivity formations only after substantially all of said first electrical current being conducted between longitudinal electrode segments first passes through said formation or drilling fluids or both.

13. The method of claim 12, further comprising making measurements with one or more azimuthal electrodes on said tool while rotating.

14. The method of claim 12, further comprising shorting electrical insulators between adjacent longitudinal electrode segments.

15. The method of claim 12, further comprising making simultaneous measurements at different frequencies across multiple electrical insulators.

* * * * *